United States Patent [19]

Moroz et al.

[11] 3,740,148

[45] June 19, 1973

[54] PORTABLE DUST ANALYZER

[75] Inventors: William J. Moroz, State College; Gerald W. Anderson, Pine Grove Mills; Victor D. Withstandley, State College, all of Pa.

[73] Assignee: Research Corporation, New York, N.Y.

[22] Filed: Dec. 8, 1970

[21] Appl. No.: 96,135

[52] U.S. Cl. .............................. 356/102, 356/208
[51] Int. Cl. ..................... G01n 15/02, G01n 21/06
[58] Field of Search ..................... 356/36, 37, 102, 356/103, 207, 208

[56] References Cited
UNITED STATES PATENTS

| 2,812,686 | 11/1957 | Sinclair | 356/103 |
| 3,462,609 | 8/1969 | Beattie | 356/103 |
| 2,909,960 | 10/1959 | Orr, Jr. et al. | 356/103 |

OTHER PUBLICATIONS

"A Portable Photometer and Particle Size Analyzer;"- Thomas Jr. et al., 8 ISA Journal 52–56.

*Primary Examiner*—Ronald L. Wibert
*Assistant Examiner*—Conrad Clark
*Attorney*—Kane, Dalsimer, Kane, Sullivan and Kurucz

[57] ABSTRACT

A portable battery powered dust analyzer operating on the principle of light-scattering from individual airborne particles moving past a high intensity light, which is capable of counting and size discriminating air-borne particulate matter over several size ranges while providing immediate readout in which the flow passage system minimizes turbulence and recirculation allowing for small physical dimensions of the device and portability.

6 Claims, 7 Drawing Figures

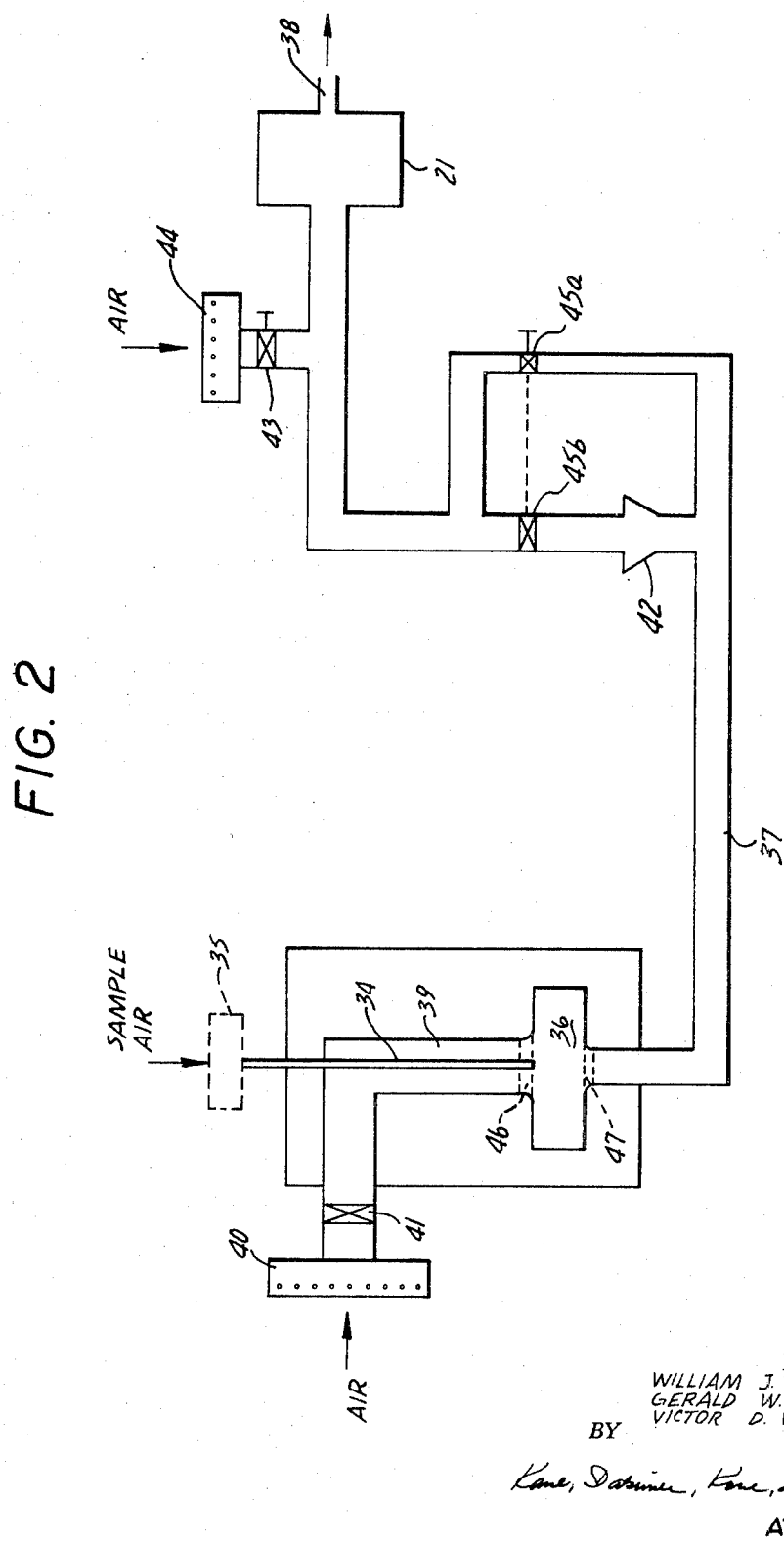

INVENTORS
WILLIAM J. MOROZ
GERALD W. ANDERSON
VICTOR D. WITHSTANDLEY
BY

ATTORNEYS

INVENTORS
WILLIAM J. MOROZ
GERALD W. ANDERSON
VICTOR D. WITHSTANDLEY
BY

ATTORNEYS

PORTABLE DUST ANALYZER

BACKGROUND OF THE INVENTION

Dust analyzers are used to monitor dust levels in coal mines where excessive dust poses health and explosion hazards. Other places where such instruments are utilized are industrial mills, foundries, quarries, factories and urban atmospheres.

No dust counting and sizing instrument weighing under 20 pounds, providing immediate readout and operating independently of external power sources is known. Most dust analyzing methods require the transport of samples, slides or liquid to surface laboratories for further treatment and visual microscopic counting. The counting techniques are time consuming and tedious and yield analyses many hours after sampling.

A portable dust-sampling instrument with immediate readout would make possible knowledge of air-borne particle distributions as functions of time and space in relation to drilling and cutting operations in mines and also in relation to mine ventilation. At present, quick readout devices are large and unwieldy and depend on a plug-in type of power supply or are relatively heavy. On the other hand, available lightweight and portable devices used in the field provide a knowledge of particle size distribution several hours after samples are taken. No currently available dust size-analyzing device provides both true portability and immediate readout.

The chief present means of dust sampling and size analysis for mine atmospheres is a method wherein a sample is collected in a liquid and the residue is later examined by microscope. Particle distributions are not known for hours after the samples are taken. There is no immediate readout. The same is true of gravimetric methods of determining particulate counts in air. In the gravimetric method particles are collected on filter paper and subsequently weighed. Both of these methods require the transport of samples, filter papers, slides or liquid to surface laboratories for further treatment and visual microscopic counting. The counting techniques are time-consuming and tedious and yield analyses many hours after sampling.

Several models of photometer-type particle analyzers have been developed. These are not portable because, if miniaturized, undesirable flow patterns would develop and existing instruments are large and bulky. These are not truly portable or operable on batteries alone.

SUMMARY OF THE INVENTION

A portable dust analyzer has been developed which is completely independent of an external power source and which has immediate readout capability enabling the instrument to function with advantage over presently employed slower methods of monitoring atmospheres.

Light-weight battery operation, solid-state circuitry, and photometer design allow the device to be packaged in a small suitcase. Portability, independence of plug-in-power supply, and immediate readout are achieved. Further the shaping of the conduits and holes within the photometer head permits aerodynamically stable flow of sample air past the field volume.

DESCRIPTION OF THE DRAWINGS

In the accompanying drawings:

FIG. 2 is a diagrammatic illustration of the air flow system of the device illustrated in FIG. 1;

DESCRIPTION OF THE PREFERRED EMBODIMENT

Figure 1:
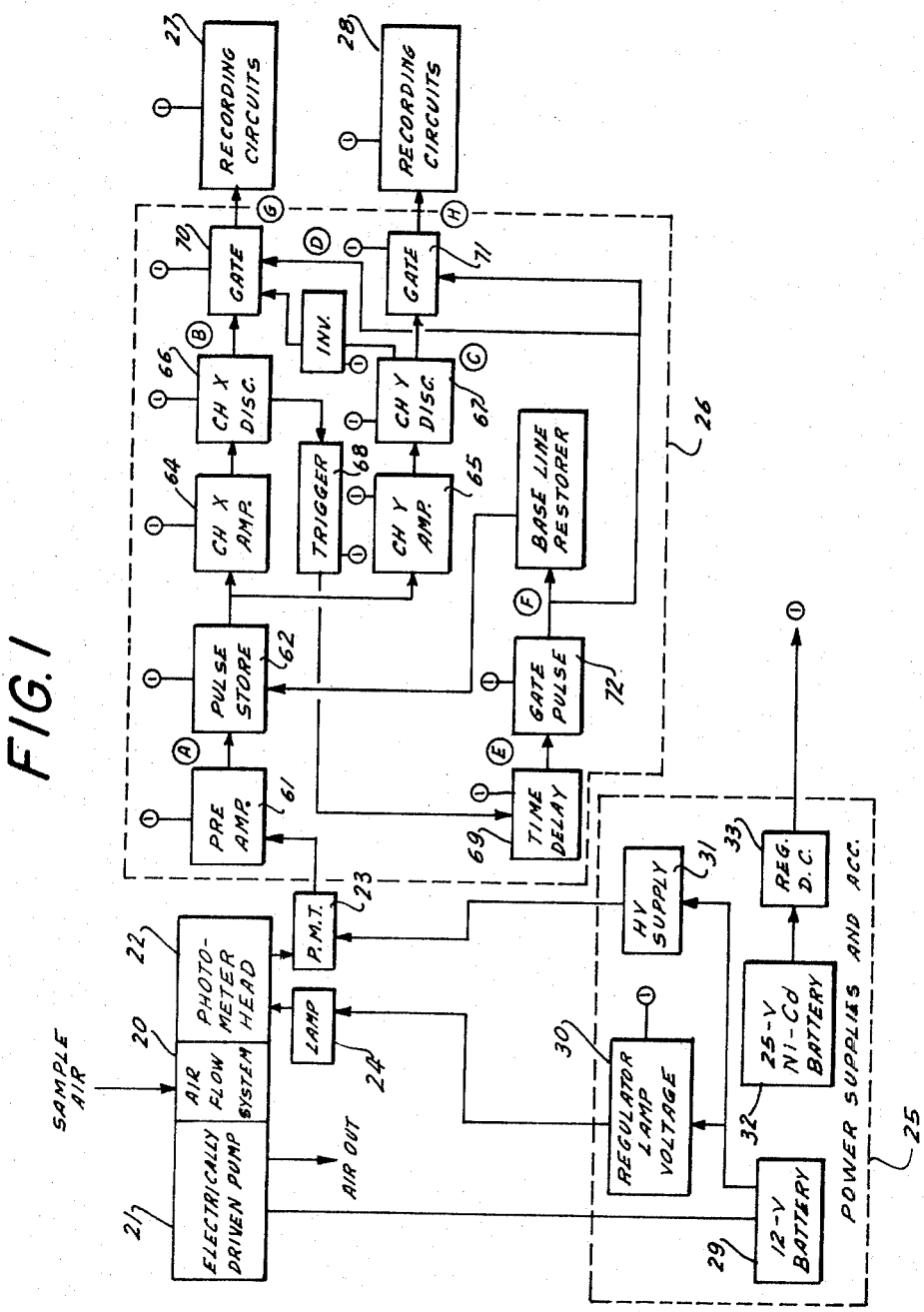
FIG. 1 is a diagrammatic illustration of the complete system with blocks representing individual components thereof.

The portable dust analyzer which is the subject of this invention is illustrated in FIG. 1 as a complete system including the air flow system 20, the pump therefor indicated by the numeral 21, photometer head 22, photomultiplier tube 23, lamp 24, associated input circuitry 25, associated output circuitry 26, and recording circuits 27 and 28.

Air to be monitored is drawn through the air flow system 20 by pump 21 where it passes through photometer head 22. A critical zone in the head 22 contains a high-intensity light flux from lamp 24 brought to a focus at the critical zone. Particles dispersed in the air passing through this critical zone are illuminated so as to yield light pulses which are in part scattered in the direction of the photo sensitive cathode of the photomultiplier tube 23, the output of which after passing through shaping and driving circuitry 26 appears immediately at recording circuits 27 and 28 as a measure of quantity and size of the dust particles in the air passing through the air flow system 20.

The input circuit 25 includes battery 29 which supplies power to pump 21 and regulator 30 for lamp 24 and also to voltage supply unit 31 for the photomultiplier tube. Nickel-cadmium battery 32 with its voltage regulator 33 is also included in the input circuitry. Battery 32 supplies power to the output circuitry 26, the recording circuits 27 and 28 and to lamp 24 through its voltage regulator 30.

The air flow system 20 is illustrated diagrammatically in FIG. 2. All air movement through the system is provided by vacuum pump 21 which is of the rotary sliding vane type. It is capable of moving 18,000 cc/min running open at 6,000 rpm. When the pump is operated sample air containing the particulate matter to be analyzed is drawn into the system through needle 34 which is hollow and which may be provided with calibrated dilution valves 35 at its input, if desired, to determine the particle counting range of the instrument. The needle terminates at the entrance to the photometer head chamber 36 so that air drawn into the system by the needle will pass through this chamber and into the channel indicated by the numeral 37 and ultimately out of the instrument at pump discharge 38. The needle 34 is disposed within channel 39 by which it is surrounded. Sheath air is drawn by the pump through filter 40 and sheath air orifice valve 41 into channel 39 with the same velocity as that of the aerosol flowing through the needle. The purpose of the sheath air is to confine the sample air to a narrow stream while at the same time suppressing turbulence. To achieve this, the velocities must be very nearly equal.

The instrument is provided with rotameter 42 for spot measurement of total flow. The total flow through the photometer head is regulated to a specific value by bleed valve 43 at additional inlet filter 44. When this flow rate is achieved the pressure difference causing flow through the sheath air channel and the sampling needle is precisely the same. In the present embodiment the value of total flow of 12,800 cc/min however the value of total flow at which equal velocity will occur may vary from specific instrument to specific instrument. Orifice valve 41 in the sheath air passage regulates the sheath air flow according to the physical dimensions of the flow passages. The flow velocity through the sampling needle 34 has been measured under the conditions of operation and the total flow is adjusted to provide the correct sheath air velocity (identical with that through the sample needle) using the rotameter for measurement.

The photometer head chamber 36 operates at a pressure slightly below atmospheric. This pressure drop is essential to flow for without it there would be no flow. A push button valve 45a–45b is provided to open the rotameter circuit. Any turbulence leads to an expansion of the jet of air which carries the particle through the light field volume or to recirculation of this air and particles so that the same particle can be counted twice. In order to get maximum light intensity and consequently maximum signal intensity it is essential that the light field volume be as small as possible.

Needle 34 and channel 39 provide straight sections of travel for sample air and sheath air respectively preceding the free jet passage through the light field volume in chamber 36. This straight section has the effect of reducing turbulence which can arise as a result of bends or surface irregularities. The parameters are the ratio of the length from a passage obstruction or bend to the diameter of the passage, the passage roughness relative to diameter and the flow rates through the passage. In FIG. 2 the length is indicated by $l$ and the diameter by $d$. Satisfactory results have been achieved with a length to diameter ratio of approximately 7:1 and the bore of the passage reamed or ground and surface finished by anodizing or an equivalent process. The Reynolds number for flow should be less than approximately 2,100 ($Re = Vdp/\mu$; where $V$ is velocity, $d$ is diameter, $p$ is gas density and $\mu$ is fluid viscosity; all in consistent units).

In order to further concentrate the particles in a very narrow flow stream where light intensity can be maximized and to avoid particle recirculation in the photometer head it is necessary to suppress turbulence of the air stream within the expanded section 36 of the photometer head. This cannot be achieved using solid boundary tubes which would be opaque to light transmission. In the subject invention it is achieved by using shaped inlet and outlet nozzles 46 and 47 respectively (bell-mouthed inlets and exits) at the point of inlet and exit of chamber 36 to minimize the generation of turbulence at these points.

Figure 5:
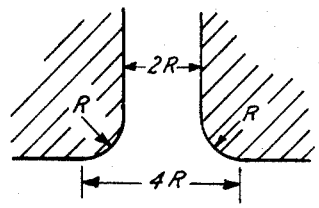
FIG. 5 is an enlarged segmentary cross sectional view of the shaped inlet nozzle (the outlet nozzle having proportionately, similar dimensions) which provides the entrance for sheath air into the photometer head sensing chamber.

The sheath air tube length to diameter ratio is designed to provide for flow straightening prior to entrance to the photometer head chamber. The exit opening results in a flow stream pattern (as a result of shaping and location) which aids in restricting the sample air jet, further assuring that recirculation of sample air does not occur. The Radii should be related to width and distance between walls as illustrated in FIG. 5 where R is the radius of corner and 2 R is the orifice diameter. The exit port 47 should be no larger in diameter than the entrance port 46 and is preferably smaller resulting in a constriction of the streamlines for the jet flow through the light field volume.

Figures 3, 4:
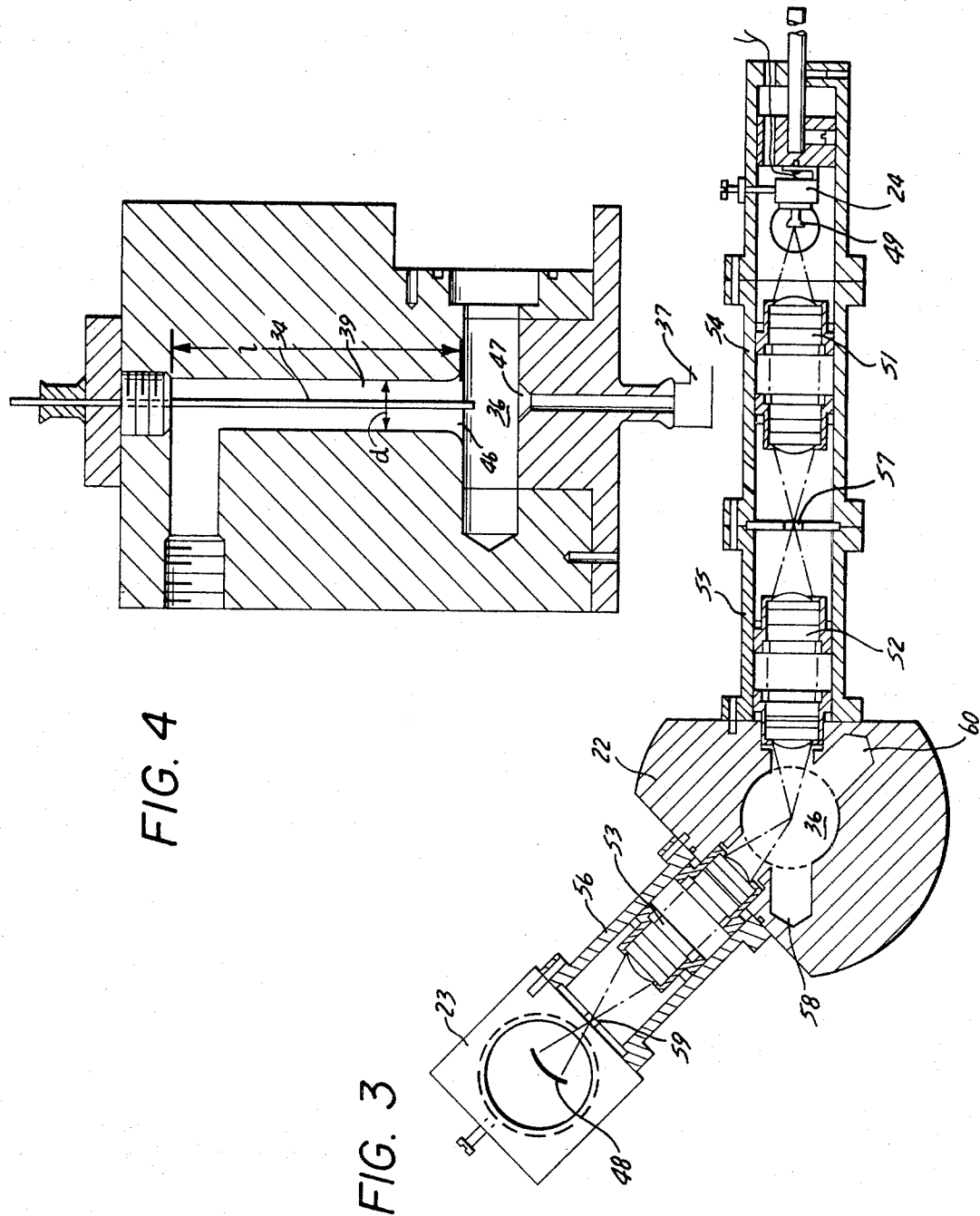
FIG. 3 is a horizontal cross sectional view of the photometer used in the device illustrating the optical system and including the photometer head, photomultiplier tube and lamp.
FIG. 4 is a vertical cross sectional view of the head assembly of the photometer illustrated in FIG. 3.

The photometer head 22, photomultiplier tube 23 and illuminating lamp 24 are shown assembled in FIG. 3 and the head 22 is shown in greater detail in FIG. 4. In the present embodiment the transducer is the photomultiplier tube 23 the photo sensitive cathode of which is indicated in the FIGS. by the numeral 48 and the light source 24 is a G E 425 filament bulb which requires about 2½ watts. It is a visible white-light source with energy peaking at about 5,600 A. The lamp 24 has a glow filament indicated by the numeral 49 and is supported within lamp housing 50. Three identical lenses 51, 52 and 53 are utilized supported within lens housings 54, 55 and 56 respectively. The lamp and lens housings are assembled with the photometer head 22 and the photomultiplier tube 23 as illustrated in FIG. 3.

Light from the glowing filament 49 of the lamp 24 is focused by lenses 51 and 52 (Hastings triplet lens, focal length 25 mm, diameter 15 mm, antireflectively coated for visible light) upon the one-sixteenth inch diameter aperture 57 between lens housings 54 and 55. Image magnification with this configuration is unity. The extreme rays are indicated by the broken lines. The purpose of the optical system between filament 49 and aperture 57 is to bring an image of the brightest part of the filament to a focus at the aperture and then to limit its extent to that which the small dimensions of the aperture will allow. This creates a sharply delineated light zone of high intensity at 57. The light field concentrated at aperture 57 enables the system to create a cleanly defined bright light field focused at the photometer head chamber 36 by lens 52. The image at aperture 57 thus is brought to a focus at the sensing zone 36, which is of small volume within which light scattering by the sampled particles takes place. The cone of light continuing (diverging) beyond zone 36 is trapped in the light trap 58.

The numeral 59 indicates an aperture between lens housing 56 and photomultiplier tube 23.

The optical system between chamber 36, aperture 59 and cathode 48 is so designed that light scattered from the zone 36 by a particle passing through chamber 36 can reach the photosensitive cathode 48 only if its path lies between the extreme rays indicated by broken lines from chamber 36 to cathode 48. Light trap 60 will prevent any scattered light from reaching the detector surface at 48 through direct reflection from the surface of the chamber surrounding 36. This second light trap also serves to eliminate stray light.

In the present embodiment all surfaces of the miniature photometer are black anodized to reduce to a minimum stray radiation which might otherwise find its way to the cathode 48, thereby constituting electronic background "noise." The design reduces the stray-light background to a tolerable level. The aperture at 59 (one-sixteenth inch in diameter) is placed so that light coming from only the direction 36 to 59 can reach 48. Radiation taking other directions toward 48 are stopped at 59.

The electronic circuitry is a pulse-height discrimination system. The unit is miniaturized by the use of solid state components and through the utilization circuitry having a minimum of components. The circuits have been designed to be very simple.

Figure 7:
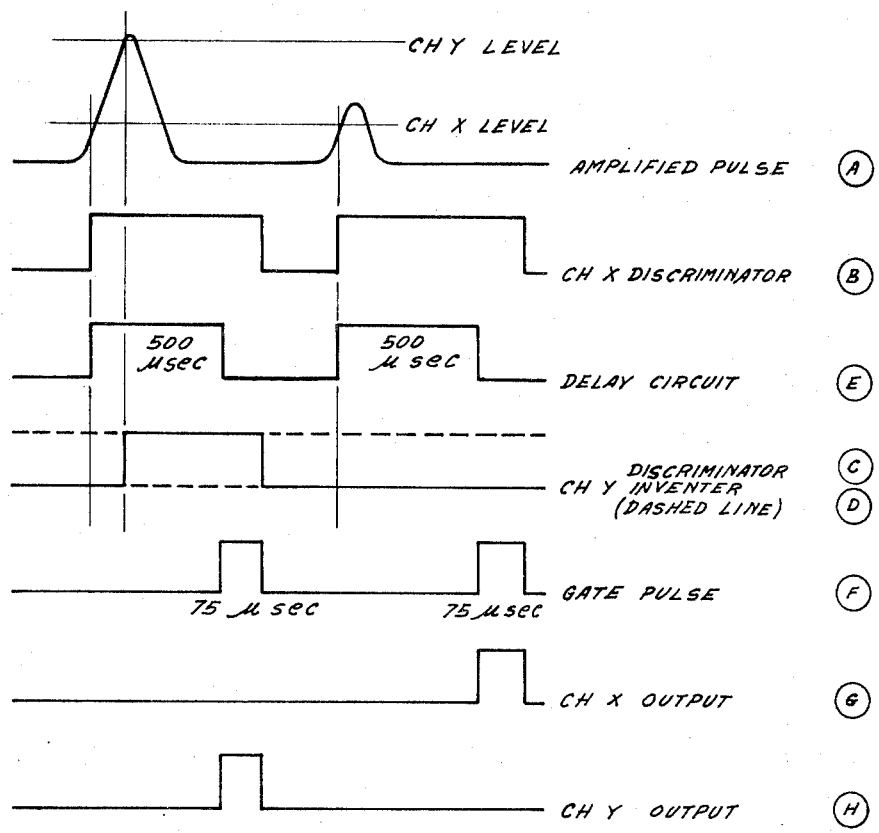
FIG. 7 illustrates the electrical wave forms which appear at various points in the electrical system of the device during use.
Figure 6:
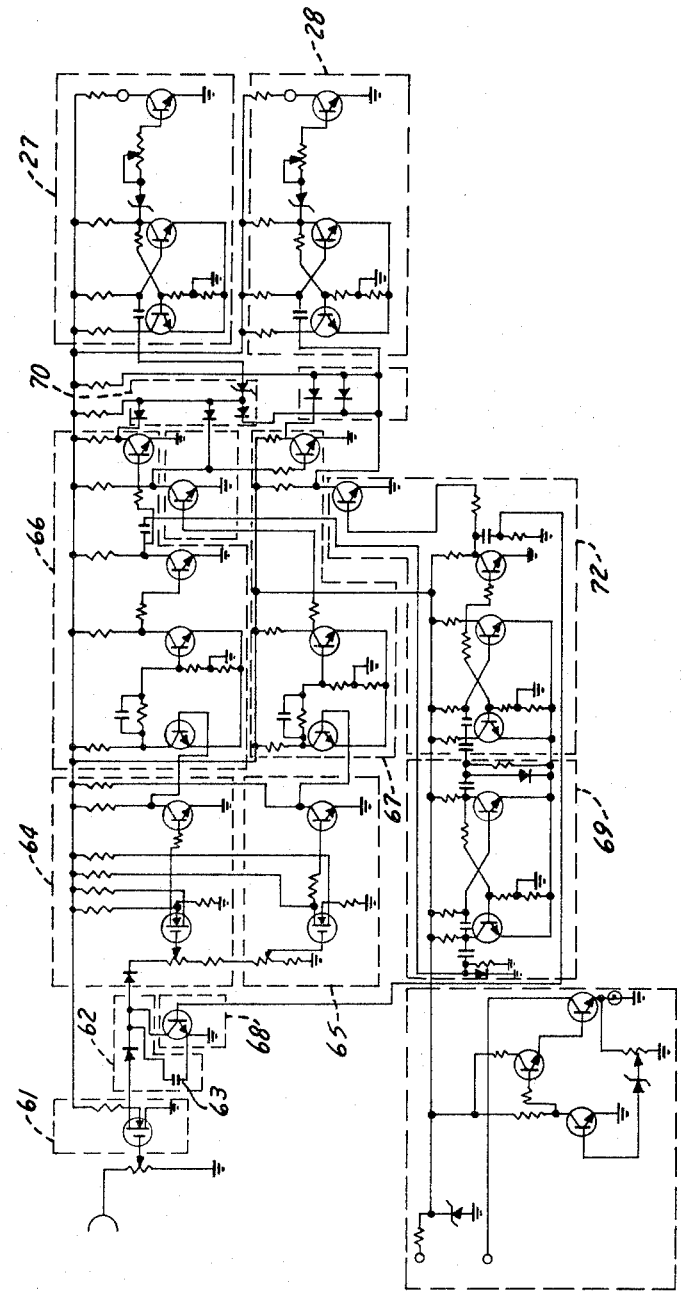
FIG. 6 is an electronic schematic of the circuitry used in the device.

The circuit is shown in schematic in FIG. 6, in block diagram form in FIG. 1 and in FIG. 7 waveforms at various points in the circuit are illustrated.

As mentioned previously, power for the motor driving the vacuum pump 20, for the PMT high-voltage supply 31, and for the lamp 24 is supplied by batteries. A separate 25-volt Ni-Cd battery 32 supplies the electronic circuits. The regulator in the PMT voltage supply 31 and in the lamp-voltage supply 30 provide constant power for these components as long as the input is between 6 and 12 volts. This allows operation until the batteries can no longer supply the power necessary to move the proper amount of air. The electronic section also has a regulated voltage at 33 to maintain proper readings as battery voltage decreases through use.

The current pulse from the PMT 23 is related to the size of the particle passing through the photometer head chamber, while the number of pulses is representative of the number of the particles. It is necessary to correlate pulse amplitude (which varies approximately as the square of particle diameter for the range of sizes of interest) with respect to the particle size. After this has been accomplished the pulses must be separated into groups according to amplitude (particle size) and the number of pulses in each group must be counted. Thus a size and concentration breakdown of the aerosol is obtained.

The block diagram of FIG. 1 and the schematic of FIG. 6 show how this is accomplished. The raw pulse is fed into preamplifier 61, the output of which is illustrated as (A) in FIG. 7. The amplified pulse then goes to the pulse storage section 62, charging a capacitor 63 (see FIG. 6) to the peak amplitude of the pulse. The decay of this capacitor voltage is very slow, providing a nearly D.C. voltage during the analysis period. This voltage is applied to the input of the amplifiers 64 and 65 for channels X and Y respectively.

The gain of amplifier 64 determines the lower counting level of channel X. The gain of amp 65 determines the lower counting level of channel Y and the upper level of channel X. The output from each amplifier is applied to the input of its channel discriminator respectively indicated by the numerals 66 and 67. The output wave form of discriminator 66 is shown as B in FIG. 7 and the output wave form of discriminator 67 is shown as C. When the input voltage to the channel X discriminator 66 is high enough to fire it pulses trigger 68 and a trigger pulse is applied to the time delay circuit 69 which is set for 500 M sec. During this time, the channel X, discriminator 66 remains fired, and the channel Y discriminator 67 may or may not fire. The output of each discriminator 66 and 67 is connected to be applied to its respective gate circuit 70 and 71. There is an "override" signal from the channel Y discriminator applied to the channel X gate if channel Y discriminator fires. At the end of 500 μ seconds the gate pulse fires providing waveform F in FIG. 7. It is this pulse which passes through channel gate 70 or 71 depending on the state of the discriminators. (See FIG. 7). Once the pulse passes through the gate it is applied to an amplifier in the output circuits which acts as a buffer and power amplifier to drive the recorders or meters 27 and/or 28. The counting sections integrate the pulse over a period greater than the 75-μ sec. pulse width. This gives an analog output directly proportional to the period of the pulse, provided the amplitude and width of the pulses remains constant.

At the end of the 75-μ sec. gate pulse a base line restorer circuit 73 discharges the input capacitor 63 in the pulse storage section which causes all circuits to revert to their original steady-state positions. The circuits are then ready to receive and process the next pulse.

We claim:

1. A portable dust analyzing device including in combination a photometer head, a chamber within said head, a straight elongated needle for introducing sample air into said chamber for passage therethrough, a passage for introducing sheath air into said chamber, an elongated cylindrical channel having a smooth inner surface on the axis of which said needle is disposed for introducing sheath air into said chamber for passage therethrough formed as a portion of said passage between a bend therein and said chamber, the length to diameter ratio of said channel being at least seven to one, a light source, first lens means for producing from said light source a cleanly defined bright light field within said chamber through which air ejected by said needle passes, a transducer, second lens means for receiving and directing light scattered in said chamber by particles in the sample air passing through the light field within said chamber to said transducer, said transducer receiving the converting light from said second lens means to electrical signals, electric circuit means for translating electrical signals from said transducer to read out form and independent power supply means operatively associated with said device for supplying electrical power thereto.

2. A portable dust analyzing device in accordance with claim 1 in which shaped inlet and outlet nozzles are provided on said chamber having axes on the line of the axis of said channel, said inlet nozzle having the same throat diameter as said channel and having a divergent mouth with a radius of divergence one-half the diameter of its throat.

3. A portable dust analyzing device in accordance with claim 2 in which said outlet nozzle has a throat diameter less than the throat diameter of said inlet nozzle and a divergent mouth with a radius of divergence of said outlet nozzle one-half the diameter of its throat.

4. A portable dust analyzing device in accordance with claim 3 in which the velocity of the sheath air and the sample air is substantially equal and the Reynolds number for flow is less than 2,100.

5. A portable dust analyzing device in accordance with claim 4 in which an electrically driven pump is provided for drawing sheath air and sample air through said chamber for discharge from said device and means are provided to adjust the velocity of the sheath air to that substantially identical with the velocity of the sample air.

6. A portable dust analyzing device in accordance with claim 1 in which the transducer is a photomultiplier tube and current pulses are developed by said photomultiplier tube having amplitude and frequency respectively proportional to the size and quantity of particles passing through said photometer head, and circuit means providing an analog output directly proportional to the period of said pulses.

* * * * *